(12) United States Patent
Munawar

(10) Patent No.: US 10,579,923 B2
(45) Date of Patent: *Mar. 3, 2020

(54) LEARNING OF CLASSIFICATION MODEL

(71) Applicant: INTERNATIONAL BUSINESS MACHINES CORPORATION, Armonk, NY (US)

(72) Inventor: Asim Munawar, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 761 days.

This patent is subject to a terminal disclaimer.

(21) Appl. No.: 14/854,885

(22) Filed: Sep. 15, 2015

(65) Prior Publication Data

US 2017/0076224 A1 Mar. 16, 2017

(51) Int. Cl.
*G06N 3/08* (2006.01)
*G06N 3/04* (2006.01)

(52) U.S. Cl.
CPC ............ *G06N 3/084* (2013.01); *G06N 3/0454* (2013.01)

(58) Field of Classification Search
CPC ................................. G06N 99/005; G06N 3/08
See application file for complete search history.

(56) References Cited

U.S. PATENT DOCUMENTS

| | | | |
|---|---|---|---|
| 6,267,722 B1 * | 7/2001 | Anderson | G01N 21/474 600/300 |
| 6,556,951 B1 * | 4/2003 | Deleo | G16H 50/20 702/183 |
| 8,484,022 B1 | 7/2013 | Vanhoucke | |
| 8,548,951 B2 | 10/2013 | Solmer et al. | |
| 2003/0108244 A1 * | 6/2003 | Li | G06K 9/00228 382/227 |

(Continued)

FOREIGN PATENT DOCUMENTS

| | | |
|---|---|---|
| WO | WO2012109407 A1 | 8/2012 |
| WO | WO2014144103 A1 | 9/2014 |

OTHER PUBLICATIONS

Bengio, Yoshua et al "Greedy Layer-Wise Training of Deep Networks" 2007 [Online] Downloaded Jun. 6, 2018 http://papers.nips.cc/paper/3048-greedy-layer-wise-training-of-deep-networks.pdf.*

(Continued)

*Primary Examiner* — Ben M Rifkin
(74) *Attorney, Agent, or Firm* — Tutunjian & Bitetto, P.C.; Vazken Alexanian

(57) ABSTRACT

A method for learning a classification model by a computer system is disclosed. One or more positive class data and one or more negative class data are prepared. The classification model is trained based on the positive class data to adjust one or more parameters of the classification model so that the positive class data is reconstructed by the classification model. The classification model is trained based on the negative class data to adjust the one or more parameters so that the negative class data is prevented from being reconstructed by the classification model. For the negative class data, changes in the one or more parameters with gradient of an objective function may be calculated using an unsupervised learning algorithm. The one or more parameters may be updated based on the changes in an opposite manner to the training based on the positive class.

25 Claims, 11 Drawing Sheets

(56) References Cited

U.S. PATENT DOCUMENTS

2004/0260521 A1* 12/2004 Aggarwal .......... G06K 9/00536
702/189
2013/0166621 A1* 6/2013 Zhu .................... H04L 67/12
709/201
2017/0076224 A1 3/2017 Munawar

OTHER PUBLICATIONS

Alex Krizhevsky and Geoffrey E. Hinton. "Using Very Deep Autoencoders for COntent-Based Image Retrieval" 2011 [Online] Downlaoded Nov. 20, 2018 https://pdfs.semanticscholar.org/64b5/4bdf023624da4f261cdd18ac57716658e81f.pdf.*

Kanishka Nithin D and Bagavathi Sivakumar "Generic Feature Learning in Computer Vision" Aug. 2015 [Online] Downloaded Nov. 20, 2018 https://core.ac.uk/download/pdf/82275619.pdf.*

Amaral, T. et al., "Using Different Cost Functions to Train Stacked Auto-encoders," 12th Mexican International Conference on Artificial Intelligence (MICAI), Nov. 2013. (pp. 1-7).

Licciardi, G.A. "Nonlinear PCA for Visible and Thermal Hyperspectral Images Quality Enhancement," IEEE Geoscience and Remote Sensing Letters, vol. 12, No. 6, Jun. 2015. (pp. 1228-1231).

Takamune, N. et al., "Maximum Reconstruction Probability Training of Restricted Boltzmann Machines With Auxiliary Function Approach," 2014 IEEE International Workshop on Machine Learning for Signal Processing, Sep. 2014. (pp. 1-6).

Jiménez-Valverde, "Insights Into the Area Under the Receiver Operating Characteristic Curve (Auc) as a Discrimination Measure in Species Distribution Modellinggeb", Global Ecology and Biogeography, (Global Ecol. Biogeogr.) (2012), Apr. 2012, pp. 498-507, vol. 21, Issue 4.

Lange, et al., "Deep Auto-Encoder Neural Networks in Reinforcement Learning", IEEE 2010, Jul. 2010, 8 pages.

Wikipedia, "Receiver Operating Characteristic", https://en.wikipedia.org/wiki/Receiver_operating_characteristic, last downloaded Jun. 20, 2017, 6 pages.

* cited by examiner

LEARNING OF CLASSIFICATION MODEL

BACKGROUND

Technical Field

The present invention generally relates to machine learning and, more particularly, to learning of classification models.

Description of Related Art

Autoencoders are artificial neural networks that have been widely used for learning representations of input signals in many applications. If a hidden layer is narrower than an input layer, compression can be achieved by the autoencoder. In deep learning architecture, input signals can be transformed into feature space. Reconstructions or features obtained from the autoencoder can be used for classification tasks.

Typically, the autoencoder is trained using a set of training data such that the autoencoder can reconstruct any input reasonably well, even though the input is not part of the training data, i.e., unseen data. Such generalization capability of the autoencoder is usually a desired feature for typical applications such as unsupervised learnings, data compressions, etc.

On the other hand, such reconstruction capability of the autoencoder is not preferable for certain application areas including, i.e., noise reductions and anomaly detections. In such applications, regarding some kinds of inputs, such as noise, anomalies are preferred not to be reconstructed.

However, there is no known technique that can limit the reconstruction capability of the autoencoder. Generally, conventional techniques merely focus on what should be reconstructed and such positive data is merely used for training the autoencoders. Thus, it can be controlled only by what has been learned well by classification models, which may be the autoencoder or include at least part of the autoencoder.

What is needed are methods, associated computer systems, and computer program products for learning a classification model that are capable of controlling reconstruction capability in the classification model by utilizing available negative data which should not be learned.

SUMMARY

According to one embodiment, there is provided a method for learning a classification model by a computer system. The method comprises preparing one or more positive class data and one or more negative class data. The method also comprises training the classification model based on the positive class data to adjust one or more parameters of the classification model so that the positive class data is reconstructed by the classification model. The method comprises further training the classification model based on the negative class data to adjust the one or more parameters so that the negative class data is prevented from being reconstructed by the classification model.

Furthermore, reconstruction capability in the classification model can be limited in a controlled fashion. It can be controlled as to what should not be learned as well as what should be learned well by the classification model.

In a preferred embodiment according to the present invention, iteration for the training based on the negative class data is repeated before the training based on the positive class data is performed. According to this embodiment, the amount of the negative class data can be reduced to be smaller than the amount of the positive class data. Since such negative class data may be rare in comparison to the positive class data, and collecting large amount of such negative class data may be practically difficult or labor intensive, it is preferred that the amount of such negative class data becomes small.

In yet another preferred embodiment according to the present invention, the training based on the positive class data and the training based on the negative class data are alternately performed until a predetermined criterion is satisfied. The learning for reconstruction is finished at the training based on the positive class data. According to this embodiment, the parameters of the classification model can be efficiently optimized to better local optimization by balancing the learning and forgetting cycles.

In yet another preferred embodiment according to the present invention, the trained classification model encodes an input signal similar to any one of the negative class data and decodes it to the representation that is most closely similar to the positive class data. Such a feature may be useful for certain applications including noise reductions and anomaly detection.

Computer systems and computer program products relating to one or more aspects are also described and claimed herein.

Further, according to yet another embodiment, there is provided a method for learning a classification model by a computer system. The method comprises preparing one or more positive class data and one or more negative class data. The method further comprises training the classification model based on the positive class data to adjust one or more parameters of the classification model. The method comprises further training the classification model based on the negative class data to adjust the one or more parameters in an opposite manner to the training based on the positive class data in regard to a gradient of an objective function.

According to this embodiment, reconstruction capability in the classification model can be limited in a controlled fashion. It can be controlled what should not be learned as well as what should be learned well by the classification model.

Further, according to another embodiment, there is provided a method for learning a neural network by a computer system. The method comprises preparing one or more positive class data and one or more negative class data. The method further comprises training the neural network based on the positive class data such that connections used to reconstruct the positive class data become strong. The method comprises further training the neural network based on the negative class data such that connections used to reconstruct the negative class data become weak.

According to yet another embodiment, reconstruction capability in the neural network can be limited in a controlled fashion. It can be controlled as to what should not be learned as well as what should be learned well by the neural network.

Additional features and advantages are realized through the techniques. Other embodiments and aspects of the invention are described in detail herein and are considered a part of the claimed invention.

BRIEF DESCRIPTION OF THE DRAWINGS

The subject matter, which is regarded as the invention, is particularly pointed out and distinctly claimed in the claims at the conclusion of the specification. The forgoing and other features and advantages of the invention are apparent from the following detailed description, taken in conjunction with the accompanying drawings, in which:

DETAILED DESCRIPTION

The present invention will be described using particular embodiments, and the embodiments described hereafter are understood to be only referred to as examples and are not intended to limit the scope.

One or more embodiments according to the present invention are directed to methods, computer systems and computer program products for learning a classification model.

Autoencoders can be used to encode input signals in various applications. Generalization capability of the autoencoders, which is an ability to reconstruct any input signal reasonably well, even though the input signal is unseen data, is a desired feature for typical applications. However, such capability is not preferred for certain application areas such as noise reductions, anomaly detections, etc.

Figure 1:
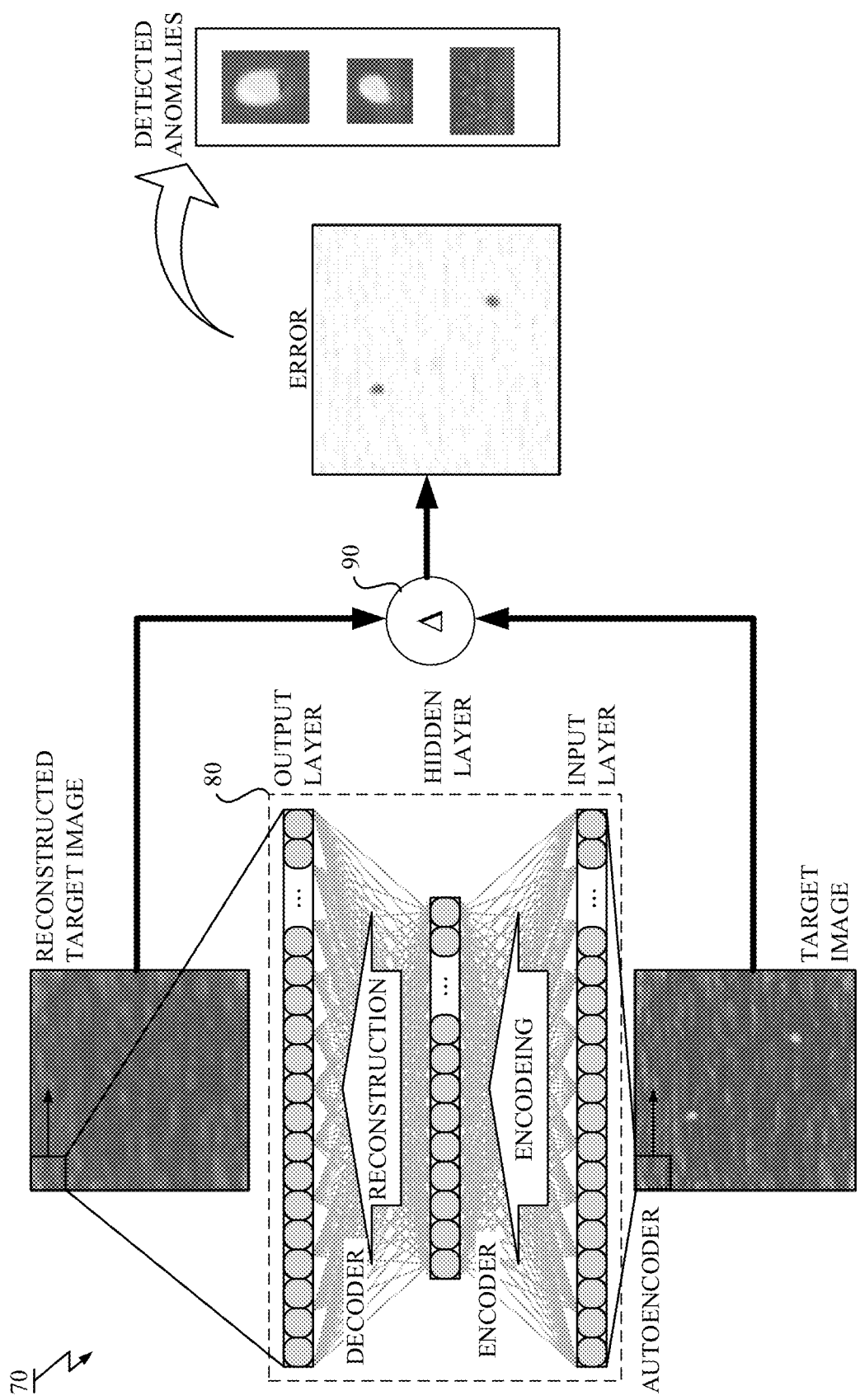
FIG. 1 is a schematic diagram showing an exemplary anomaly detection system using an autoencoder, in which limiting reconstruction capability of the autoencoder is preferred.

Referring to FIG. 1, there is shown an anomaly detection system using an autoencoder, in which limiting the reconstruction capability of the autoencoder is preferred.

As shown in FIG. 1, an anomaly detection system 70 includes an autoencoder 80 and an image subtraction unit 90. The autoencoder 80 may include an input layer, a hidden layer and an output layer. Patch images, segmented from a target image, are fed into the input layer of the autoencoder 80. The autoencoder 80 performs reconstruction of the input images and resulted images are outputted from the output layer. The output images are then merged into a reconstructed target image. The image subtraction unit 90 subtracts the reconstructed target image from the target image to calculate an error map between the images. After obtaining the error map, a region presenting relatively large error can be detected as an anomalous region where a non-positive object, i.e., an anomaly, may be contained.

In this application, the autoencoder is trained such that the autoencoder can only reconstruct positive data (e.g. sea) as well as possible and suppress reconstruction of any non-positive data (e.g. anomaly such as noise, garbage, etc.). If the autoencoder 80 can encode any input image and reconstruct it as a positive data, it can be easily found out what is anomalous. Anything that is not reconstructed can be considered as an anomaly.

Although merely positive data, that should be reconstructed, is used for training the autoencoder and non-positive data may be carefully removed from training data, the trained autoencoder can acquire an ability to reconstruct unseen signals similar to the non-positive data. Thus, non-positive objects contained in the target image may also be reconstructed. Narrowing the hidden layer of the autoencoder can limit reconstruction capability for non-positive data; however, it may lose the accuracy for the positive data.

Therefore, there are needed methods, computer systems and computer program products for learning a classification model that are capable of controlling reconstruction capability in the classification model without increasing number of training epochs and losing the accuracy for the positive data.

In one or more embodiments according to the present invention, a novel learning process is conducted in which not only positive class data to be learned, but also negative class data to not be learned, are utilized for training the classification model. Additionally, a negative training based on the negative class data as well as a positive training based on the positive class data are performed. The classification model may be a reconstruction model or include at least part of the reconstruction model. The reconstruction model may be an autoencoder. During the positive training, the classification model is trained to adjust one or more parameters of the classification model so that the positive class data can be reconstructed by the classification model. In contrast to positive training, during the novel negative training, the classification model is trained based on the negative class data to adjust one or more parameters of the classification model so that the negative class data is prevented from being reconstructed by the classification model.

In other aspects, the negative training is performed so as to adjust the one or more parameters in an opposite manner to the positive training in regard to gradient of an objective function used in an unsupervised learning algorithm. In terms of neural networks, in contrast to the positive training, the negative training is performed such that connections used to reconstruct the negative class data become weak.

According to the novel learning process of one or more embodiments, reconstruction capability in the classification model can be limited in a controlled fashion. It can be controlled as to what should not be learned as well as what should be learned well by classification model, thereby improving classification performance without increasing the number of training epochs and losing accuracy for the positive class data.

Now, referring to the series of FIGS. 2-7, there are shown computer systems and methods for learning a classification model according to one or more embodiments. The novel learning technique is not specific to the autoencoder; the novel learning technique can be generic and applicable to any reconstruction model and classification model that may include parameters used for reconstructing or encoding a signal.

Hereinafter, referring to the series of FIGS. 2-5, a computer system and method for an autoencoder to learn according to an exemplary embodiment, in which the autoencoder is trained so as to have image reconstruction capability, will be described. Then, referring to the series of FIGS. 6-7, computer systems and methods for learning classification models according to other embodiments, in which the classification models including at least part of the autoencoder in deep learning architectures are trained, will be described. The data treated by the classification models may not be limited to the image data and can be expanded to any data which has spatial and/or temporal structures, such as image data, acoustic speech data, video data, etc.

Figure 2:
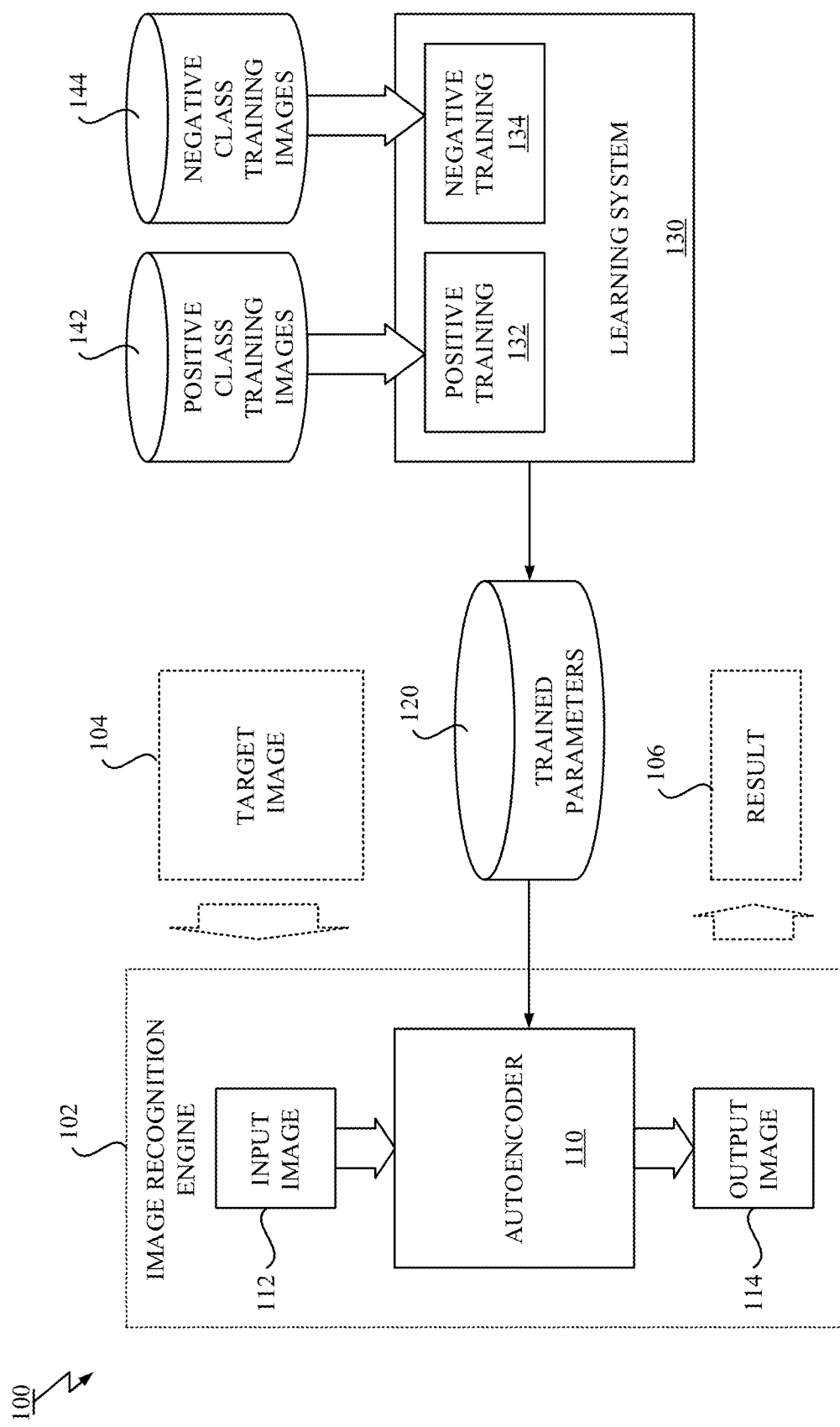
FIG. 2 is a block/flow diagram showing an exemplary computer system incorporating an autoencoder and a learning system for the autoencoder according to an exemplary embodiment of the present invention.

FIG. 2 illustrates a block/flow diagram showing an exemplary computer system incorporating an autoencoder and a learning system for the autoencoder according to an exemplary embodiment.

As shown in FIG. 2, the computer system 100 includes an autoencoder 110 that receives an input image 112 and outputs an output image 114 reconstructed from the input image 112 using trained parameters 120; and a learning system 130 that performs machine learning of the autoencoder 110 based on a set of training images 142, 144 to obtain the trained parameters 120.

In the present embodiment, the autoencoder 110 may include an input layer, a hidden layer and an output layer. The autoencoder 110 receives a patch image as the input image 112 by the input layer and outputs a reconstructed patch image as the output image 114 from the output layer. Each pixel may hold, but is not limited to, a binary value, a grayscale value or a color value. The image may be provided as, but is not limited to, an image file, a part of the image file, a frame or part of the frame of video file or video stream.

As shown in FIG. 2, there may be described an image recognition engine 102 incorporating the autoencoder 110. The image recognition engine 102 may perform tasks including, at least, detecting anomalous objects, reducing noise, classifying images or pixels into classes (e.g. /sky/, /car/, /cat/, etc.) or the like. The image recognition engine 102 may receive a target image 104, perform the above-mentioned task and output a result 106 that may include anomalous objects, de-noised images, predicted classes or class probabilities, etc. depending on the task.

The learning system 130 performs the process for the autoencoder 110 to learn according to an exemplary embodiment. The learning system 130 performs the learning process using the given training images 142, 144 to optimize parameters of the autoencoder 110.

In one embodiment, the training images are divided into two classes of the training images, including positive class training images 142 and negative class training images 144. The training images 142, 144 include a plurality of images, each of which may be assigned a label indicating whether each image is positive or negative. The positive class training image is defined as data which is preferred to be reconstructed well, whereas the negative class training image is defined as data which is not preferred to be reconstructed. The label may be assigned by typically human experts. However, it does not preclude that the positive class training images 142 include some of the data that is not preferred to be reconstructed.

In the describing embodiment, the learning system 130 includes a positive training module 132 for training the autoencoder 110 using the positive class training images 142; and a negative training module 134 for training the autoencoder 110 using the negative class training images 144.

The positive training module 132 trains the autoencoder 110 to adjust the parameters 120 of the autoencoder 110 such that every input images can be reconstructed as well as possible. The positive training may enable the autoencoder 110 to reconstruct a huge number of the input images. In terms of neural networks, the connections that are used to reconstruct the positive class images become strong by the positive training. When some image similar to any one of the positive class training images 142 is inputted to the autoencoder 110, the trained autoencoder 110 can output a reasonably well reconstructed image of the input image.

The negative training module 134 trains the autoencoder 110 to adjust the parameters 120 of the autoencoder 110 such that input images is not reconstructed well. In terms of the neural networks, the connections that are used to reconstruct the negative class image become weak by the negative training. The negative training is similar to forgetting. The autoencoder 110 is first trained so as to reconstruct the positive class images 142 by the positive training, but then the autoencoder 110 forgets the part of the learned system during the negative training. When some image similar to any one of the negative class training images 144 is inputted to the autoencoder 110, the trained autoencoder 110 does not output a reconstructed image back.

The learning system 130 may perform the positive training by the positive training module 132 and the negative training by the negative training module 134 alternately until a predetermined termination criterion is satisfied. In one embodiment, the positive training may be performed at the end of the learning. The termination criterion may be a convergence criterion based on a metric measuring convergence of the optimization, such as, e.g., reconstruction error or a stopping criterion such as the number of epochs.

In one embodiment, each of modules described in FIG. 2 may be implemented on a computer system, where program codes according to the embodiment are loaded on a memory and executed by a processor.

As shown in FIG. 2, the computer system 100 includes one or more modules to provide various features and functions. These modules may be implemented in hardware, software or firmware executable on hardware, or a combination thereof. Also, these modules are presented only by way of example and are not intended to suggest any limitation. Alternative embodiments may include additional or fewer modules than those illustrated in FIG. 2, or the modules may be organized differently. Furthermore, it should be recognized that, in some embodiments, the functionality of some modules may be broken into multiple modules or, conversely, the functionality of several modules may be combined into a single or fewer modules.

Figure 3:
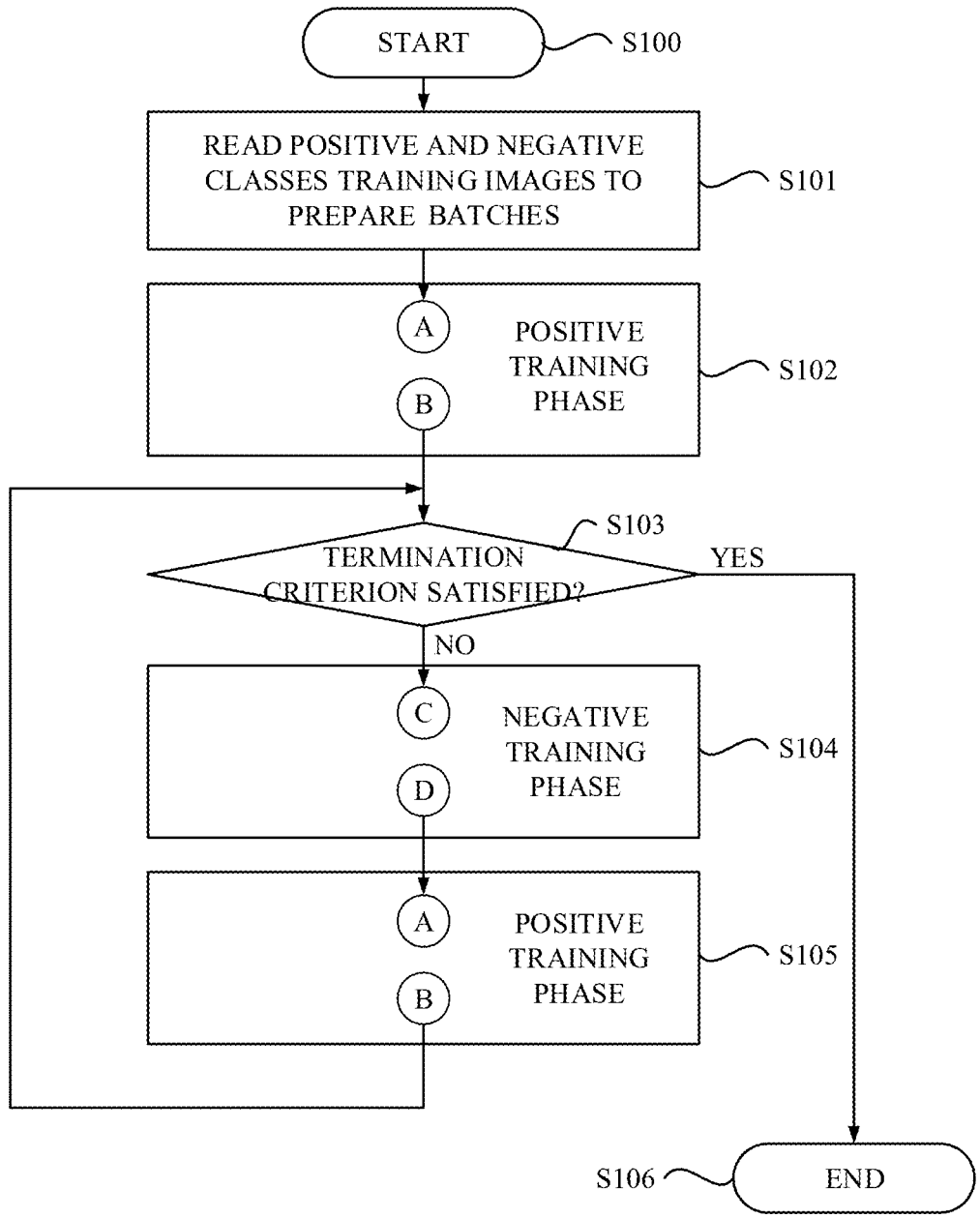
FIG. 3 is a block/flow diagram showing an exemplary process for autoencoder learning according to an exemplary embodiment.
Figure 4A:
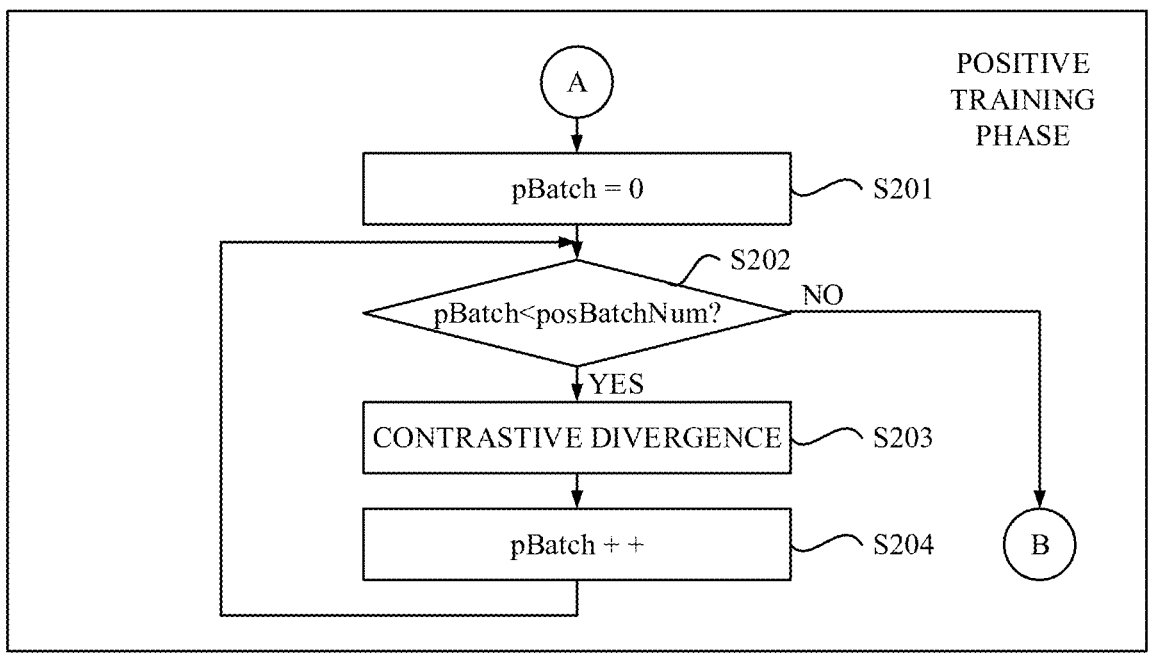
FIG. 4A is a block/flow diagram showing an exemplary positive training phase in the process shown in FIG. 3.
Figure 4B:
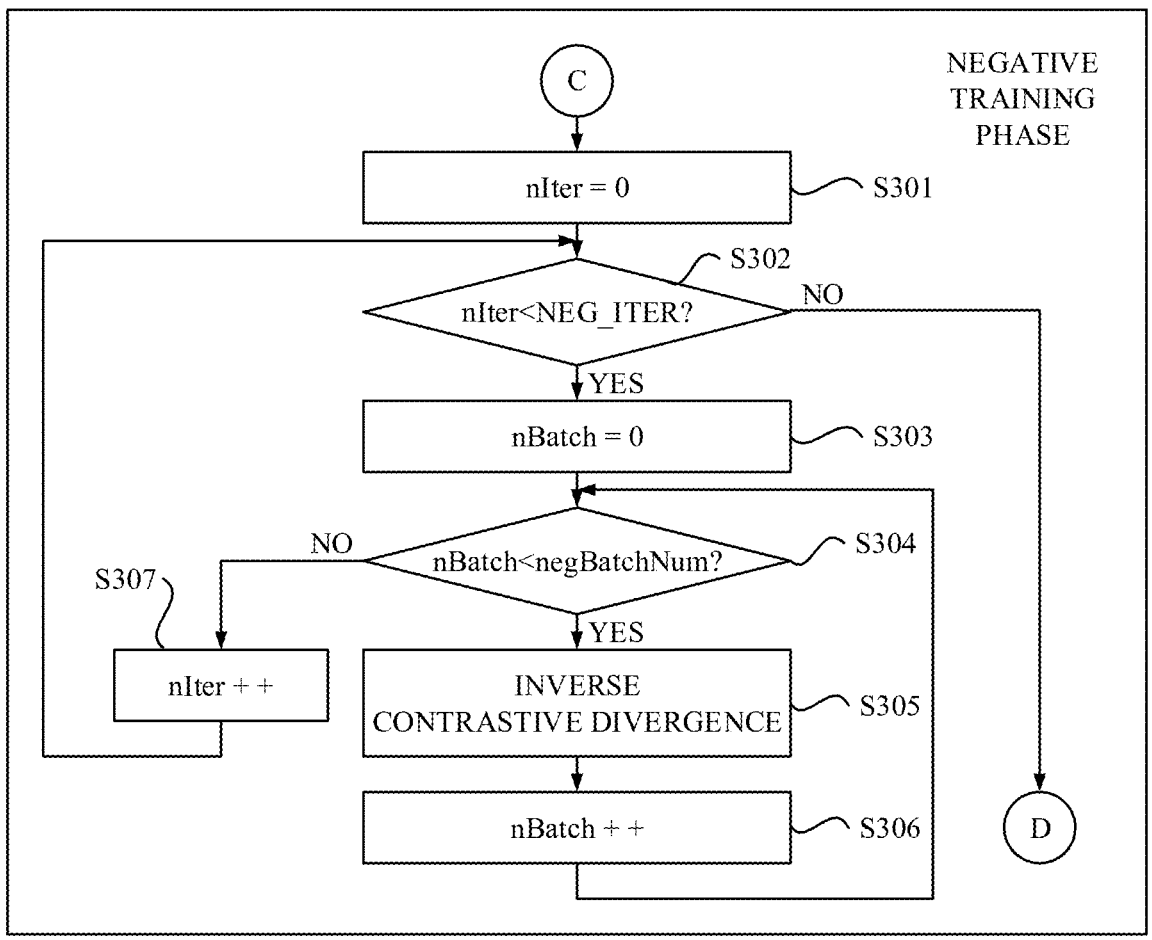
FIG. 4B is a block/flow diagram showing an exemplary negative training phase in the process shown in FIG. 3.

FIG. 3 and FIGS. 4A-B show a block/flow diagrams depicting a process for autoencoder learning according to an exemplary embodiment. FIG. 3 shows a main flowchart, while FIGS. 4A and 4B show parts of the flowchart depicting a positive training phase and a negative training phase, respectively, in the process shown in FIG. 3.

Note that the process shown in FIG. 3 and FIGS. 4A-B is one of embodiments in which an RBM (Restricted Boltzmann Machine) is used as the autoencoder 110 and a CD (Contrastive Divergence) method is used as an unsupervised learning algorithm for the RBM. However, implementations of the autoencoder and corresponding unsupervised learning algorithms are not limited to the particular implementation and algorithm. Any implementations of the autoencoder 110, which may be used as a building block in a deep learning architecture, as well as any appropriate unsupervised learning algorithms, can be used in one or more embodiments.

As shown in FIG. 3, process begins at step S100. Note that the process shown in FIG. 3 is performed by the learning system 130 depicted in FIG. 2 for the given training images 142, 144.

Figure 5:
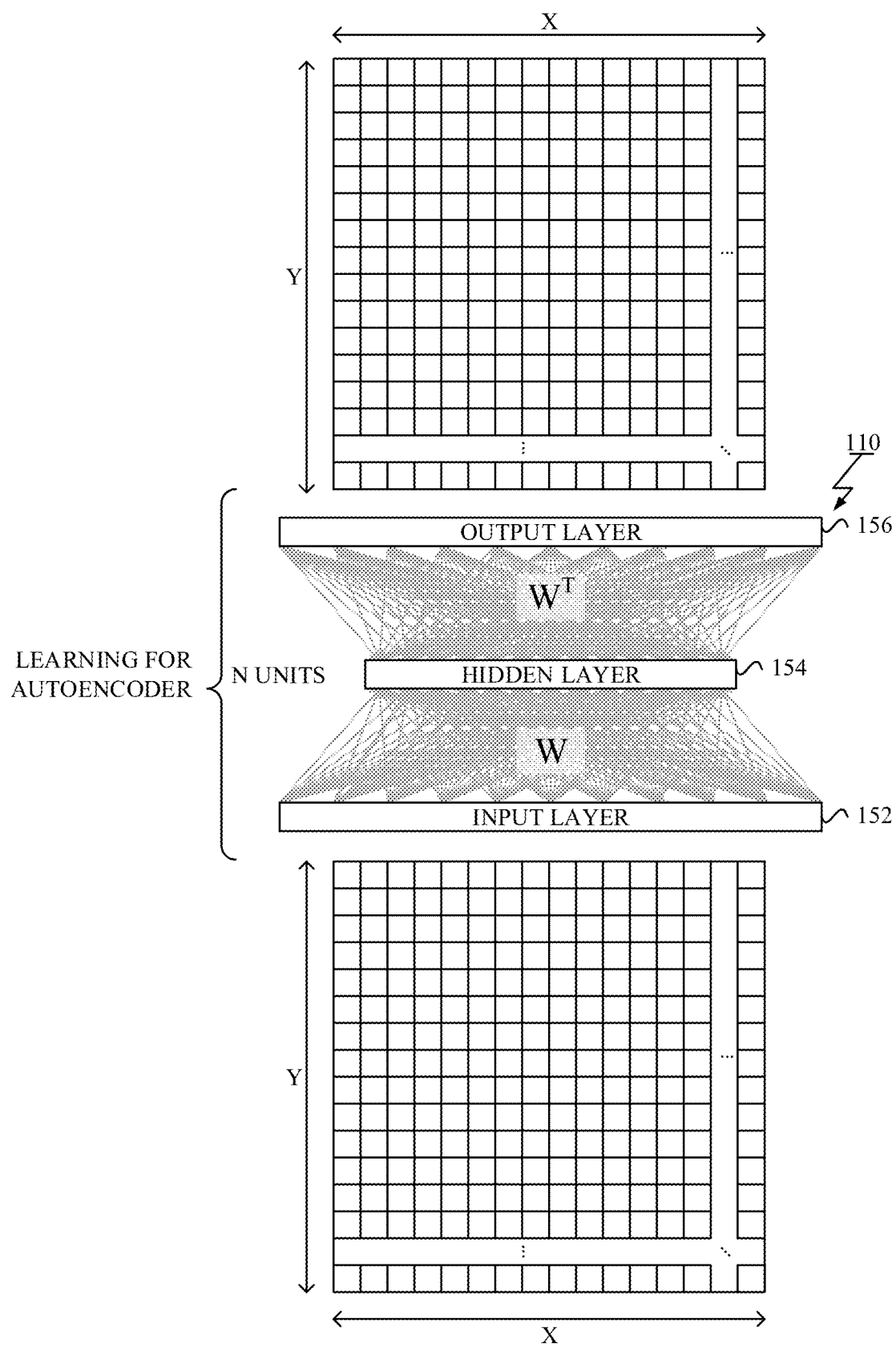
FIG. 5 is a diagram showing an exemplary target of the learning process according to an exemplary embodiment.

Referring to FIG. 5, a target of the learning process shown in FIG. 3 and FIG. 4 is illustrated. The targeted autoencoder 110 includes an input layer 152 of X*Y units, a hidden layer 154 of N units, and an output layer 156 that may have same size of the input layer 152. The hidden layer 154 may be narrower, wider than, or equal to the input layer 152. The X represents the width of the patch image and the Y represents the height of the patch image. Parameters that should be trained may include a weight matrix (W) associated with the connections between hidden units and visible units, a hidden bias vector (b) and a visible bias vector (b'). For both layers, an activation function may be any one of known activation functions, including a sigmoid function, a tan h function, ReLU (Rectified Linear Unit) function, etc.

Before performing learning, there are several learning parameters to be set. Such parameters may include the number of negative training iterations (NEG_ITER), the number of training examples for single learning step (BATCH_SIZE), the number of positive batches (posBatchNum), and the number of negative batches (negBatchNum). Suppose that posNum and negNum represent the total number of the negative and positive class training images, respectively, the number of the positive batches (posBatchNum) is set to be posNum/BATCH_SIZE and the number of the negative batches (negBatchNum) is set to be negNum/BATCH_SIZE The learning parameters also include the termination criterion such as the convergence criterion and/or the stopping criterion. The learning parameters further include parameters for algorithms such as a learning rate, a momentum, a weight cost, a sparsity target, etc.

Referring again to FIG. 3, at step S101, the learning system 130 reads the positive class training images 142 and the negative class training images 144 and divides them into batches, each of which includes the predetermined number of the training images (BATCH_SIZE).

At step S102, the learning system 130 enters the positive training phase by using the positive training module 132. More detail about the positive training phase will be described later. At step S103, the learning system 130 determines whether the termination criterion is satisfied or not. If the learning system 130 determines that the termination criterion is not satisfied yet in step S103 (NO), the process branches to step S104. At step S104, the learning system 130 enters the negative training phase by using the negative training module 134. More detail about the negative training phase will be described later. At step S105, the learning system 130 again enters the positive training phase by using the positive training module 132.

After the positive training phase at step S105, the process loops to step S103. The positive training and the negative training phases are alternately performed until satisfying the predetermined termination criterion. If the learning system 130 determines that the termination criterion is satisfied in step S103 (YES), the process branches to step S106 and ends at step S106. The obtained parameters of the autoencoder 110 may be stored as the trained parameters 120 in an appropriate storage system.

According to the learning method shown in FIG. 3, the parameters of the autoencoder can be efficiently optimized to better local optimum by balancing of learning and forgetting cycles. Note that the positive training phase is preferably performed at the end of the learning process in order to finish appropriately the learning process.

Referring now to FIG. 4A, the positive training phase is started at point A. At step S201, the positive training module 132 initializes a count of the positive batches (pBatch) to be zero. At step S202, the positive training module 132 determines whether the count of the positive batches (pBatch) does not reach the specified number of the positive batches (posBatchNum). If the positive training module 132 determines that the count of the positive batches does not reach the specified number of the positive batches (pBatch<posBatNum) in step S202 (YES), then the process branches to step S203.

At step S203, the positive training module 132 performs an ordinary contrastive divergence method to adjust the parameters of the autoencoder 110. By the ordinary contrastive divergence method, the positive training module 132 calculates changes in the parameters with gradient of an objective function that is contrastive divergence and updates the parameters based on the calculated changes in a normal manner. The parameters of the autoencoder may move to an improving direction in the search space.

At step S204, the positive training module 132 increments the count of the positive batches (pBatch) and then the process loops to step S202. If the positive training module 132 determines that the count of the positive batches reaches the number of positive batches (pBatch=posBatchNum) in step S202 (NO), then the process branches to point B to exit the positive training phase. Note that performing the positive training phase at once, which includes posBatchNum batches with the fixed size (BATCH_SIZE) and every item in the positive class training images 142 is used at once, may constitute one epoch.

Referring now to FIG. 4B, the negative training phase is started at point C. At step S301, the negative training module 134 initializes a count of the negative training iterations (nIter) to be zero. At step S302, the negative training module 134 determines whether the count of the negative training iterations (nIter) does not reach the specified number of the negative training iteration (NEG_ITER). If the negative training module 134 determines that the count does not reach the specified number of negative training iterations (nIter<NEG_ITER) in step S302 (YES), then the process branches to step S303.

At step S303, the negative training module 134 initializes a count of the negative batches (nBatch) to be zero. At step S304, the negative training module 134 determines whether the count of the negative batches (nBatch) does not reach the specified number of the negative batches (negBatchNum). If the negative training module 134 determines that the count of the negative batches does not reach the number of the negative batches (nBatch<negBatNum) in step S304 (YES), then the process branches to step S305.

At step S305, the negative training module 134 performs an inverse contrastive divergence method to adjust the parameters 120 of the autoencoder 110. By the inverse contrastive divergence method, the negative training module 134 calculates changes in the parameters with gradient of the objective function that is same as that used in the positive training phase and updates the parameters based on the calculated changes in an opposite manner to the positive training phase in regard to gradient of the objective function.

With regard to the contrastive divergence method, the changes in the weights may be calculated by the following learning rule:

$$\Delta w_{ij} = e(\langle v_i h_j \rangle_{data} - \langle v_i h_j \rangle_{reconstruction}),$$

where the angle brackets are used to denote expectations under the distribution of training data and reconstruction, and coefficient, e, is the learning rate. The above learning rule may closely approximate the gradient of the contrastive divergence.

In contrast to the positive training phase where the parameters are updated by the following equation (1), during the negative training phase the parameters are updated by the following equation (2) that is opposite to the manner of the positive training phase. These equations are as follows:

$$w_{ij} = w_{ij}' + \Delta w_{ij} \quad (1) \text{ (during positive training phase)}$$

$$w_{ij} = w_{ij}' - \Delta w_{ij} \quad (2) \text{ (during negative training phase)}$$

where $w_{ij}$ represents a weight for current iteration and $w_{ij}'$ represents a weight for previous iteration. Thus, the parameters of the autoencoder may move against gradient of the objective function (the improving direction in the search space). Almost the same learning rule may be used for both the visible and hidden biases. Note that the sign may depend on whether the objective function should be maximized (i.e. gradient ascend) or minimized (i.e. gradient descent). Also note that only the gradient changes its sign, and every other term in the objective function may keep its sign for the inverse contrastive divergence method.

At step S306, the negative training module 134 increments the count of the negative batches (nBatch) and then the process loops to step S304. If the negative training module 134 determines that the count of the negative batches reaches the specified number of the negative batches (nBatch=negBatchNum) in step S304 (NO), then the process branches to step S307. At step S307, the negative training module 134 increments the count of the negative training iterations (nIter) and then the process loops to step S302. If the negative training module 134 determines that the count reaches the number of the negative training iterations (nIter=NEG_ITER) in step S302 (NO), then the process branches to point D to exit the negative training phase.

According to the novel learning process shown in FIG. 3 and FIGS. 4A-B, the reconstruction capability of the autoencoder 110 can be limited in a controlled fashion. It can be controlled as to what should not be learned as well as what should be learned well by the autoencoder 110.

Also, according to the novel learning process shown in FIG. 3 and FIGS. 4A-B, the trained autoencoder 110 can reconstruct all input images (including an image similar to any one of the negative class training images 144) into some shape similar to any one of the positive class training images 142. Such a feature may be useful for certain applications, such as noise reductions, anomaly detection, etc.

Further, according to the novel learning process shown in FIG. 3 and FIGS. 4A-B, iteration for the negative training phase is repeated by fixed times (NEG_ITER) before the positive training phase is performed. By setting this parameter (NEG_ITER) to be greater than one, the required amount of the negative class training image 144 can be reduced to be much smaller than the amount of the positive class images 142. Since such negative class training images 144 are generally rare relative to the positive class training images 142, it is preferred that the amount of the negative class training images 144 becomes small.

Also, according to the novel learning process shown in FIG. 3 and FIGS. 4A-B, the positive training phase and the negative training phase are alternately performed and the learning process is started at the positive training phase and finished at the positive training phase. The parameters of the autoencoder can be efficiently optimized to better local optimization by balancing of learning and forgetting cycles without losing accuracy for the positive class images.

Alternative embodiments are described below.

As described above, the novel learning technique, according to one or more embodiments, is not specific to the autoencoder. It can be generic and applicable to any reconstruction model or classification model that includes parameters used for reconstructing or encoding a signal and receives some input signals and outputs some classification results.

Furthermore, the unsupervised learning algorithms, to which the novel learning technique can be applied, are not limited to the contrastive divergence method. They may be any one of unsupervised learning algorithms, including a contrastive divergence method, a stochastic gradient descent method, a batch gradient descent method, a persistent contrastive divergence method, a Gibbs sampling method, and variants thereof. These unsupervised learning algorithms may share a common concept in which the model is trained to adjust the parameters with an approximated gradient of the objective function. With regard to the negative training, the model is trained to adjust the parameters against the gradient of the objective function.

Hereinafter, referring to the series of FIGS. 6-7, there are shown computer systems and methods for learning classification models according to embodiments in which the classification models includes at least part of the autoencoder in deep learning architectures.

In the deep learning architecture, the above-mentioned autoencoder with one hidden layer can be used as a building block to construct a multilayered deep neural networks (DNNs). The DNN has one or more hidden layers with a plurality of hidden units between input and output layers. FIG. 6 depicts a deep autoencoder 200 that performs a reconstruction task and FIG. 7 depicts a DNN based classification model 300 that performs a classification task.

To train the DNN, typically, a two-step learning process, which includes an unsupervised pre-training process and a supervised fine-tuning process, is performed. The pre-training finds representation that captures characteristics of the input well and stacks layers with initializing parameters. Activation in the hidden layer can be seen as a better representation that expresses input. The fine-tuning process discriminatively updates the parameters of the DNN based on the representations estimated by the pre-training process.

Figure 6:
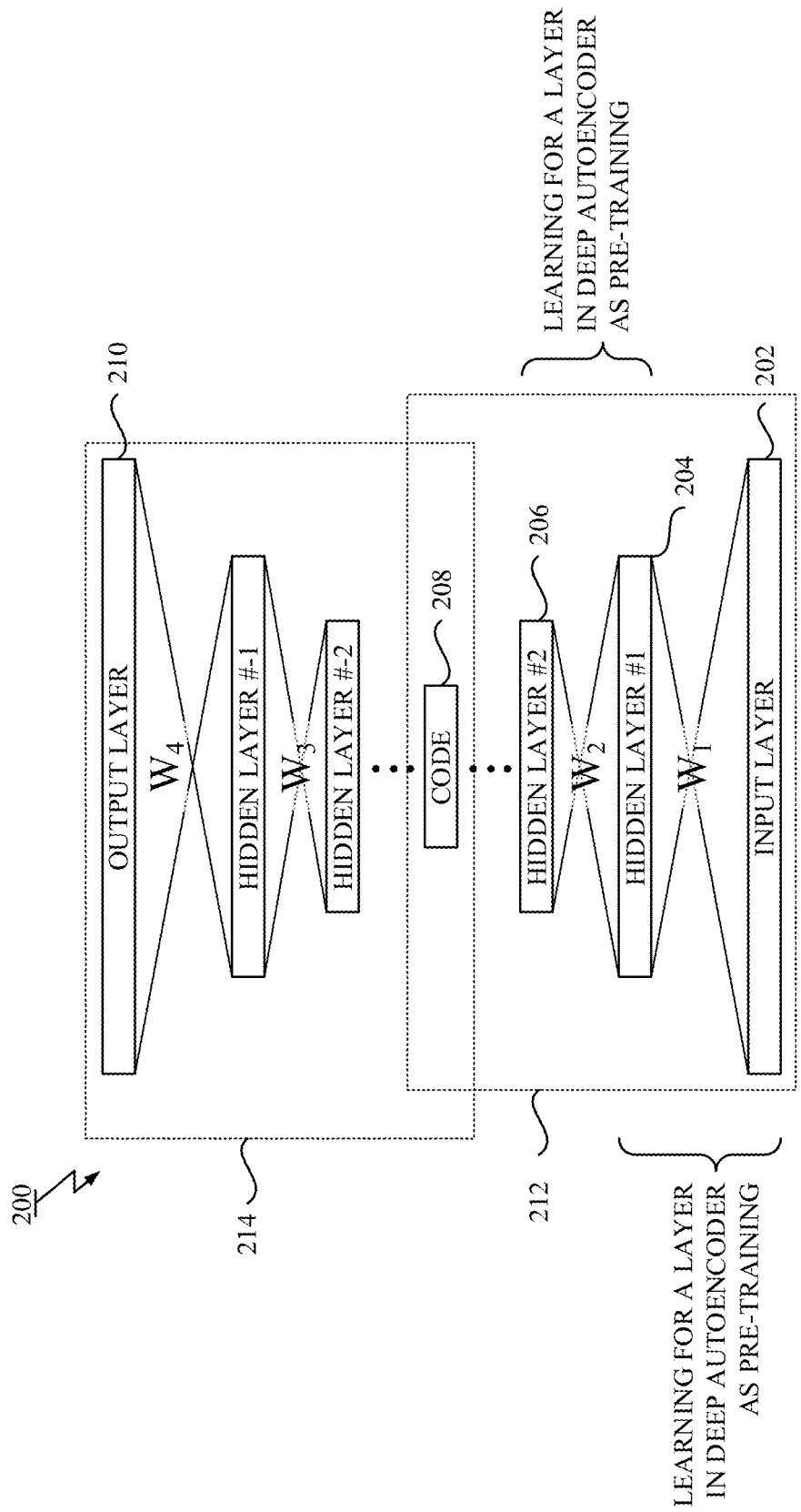
FIG. 6 is a diagram showing an exemplary target of a learning process according to one embodiment of the present invention.

Referring to FIG. 6, the deep autoencoder 200 has the one or more hidden layers between an input layer 202 and an output layer 210, one of which is a central narrow hidden layer 208 that represents low-dimensional codes. A lower half part 212 of the deep autoencoder 200 provides an encoder part, and an upper half part 214 provides a decoder part. The deep autoencoder 200 receives an input signal and outputs an output signal, reconstructed from the input signal using trained parameters.

The pre-training of the deep autoencoder 200 includes learning a stack of the autoencoders, each of which has only one layer. The parameters of the deep autoencoder 200 can be initialized in a layer by layer manner. In one embodiment, at the beginning, the pre-training process is conducted to the a hidden layer 204 so as to initialize the weigh matrix and the bias vector. After initializing the first hidden layer, the obtained parameters are fixed and the learned feature activations of the first hidden layer 204 may be used as the input for training a next layer 206 in the stack.

After the pre-trainings for all layers 202-208 for the encoder part 212 are completed, the obtained layers are unrolled to construct the deep autoencoder 200. The initial parameters for the decoder part 214 may be transposed parameters for the encoder part 212. The deep autoencoder 200 may be further fine-tuned using any known backpropagation algorithms based on the initialized parameters.

In one or more embodiments according to the present invention, any one of the hidden layers in the deep autoencoder 200 can be initialized by using the novel learning process as the pre-training. Thus, the computer system and method for learning the deep autoencoder may include the novel learning process shown in FIG. 3 and FIGS. 4A-B to initialize at least one hidden layer during the pre-training process. The trained deep autoencoder 200 has a capability of reconstructing any input signal (including a signal similar to any one of the negative class data) as some signal similar to any one of positive class data.

Figure 7:
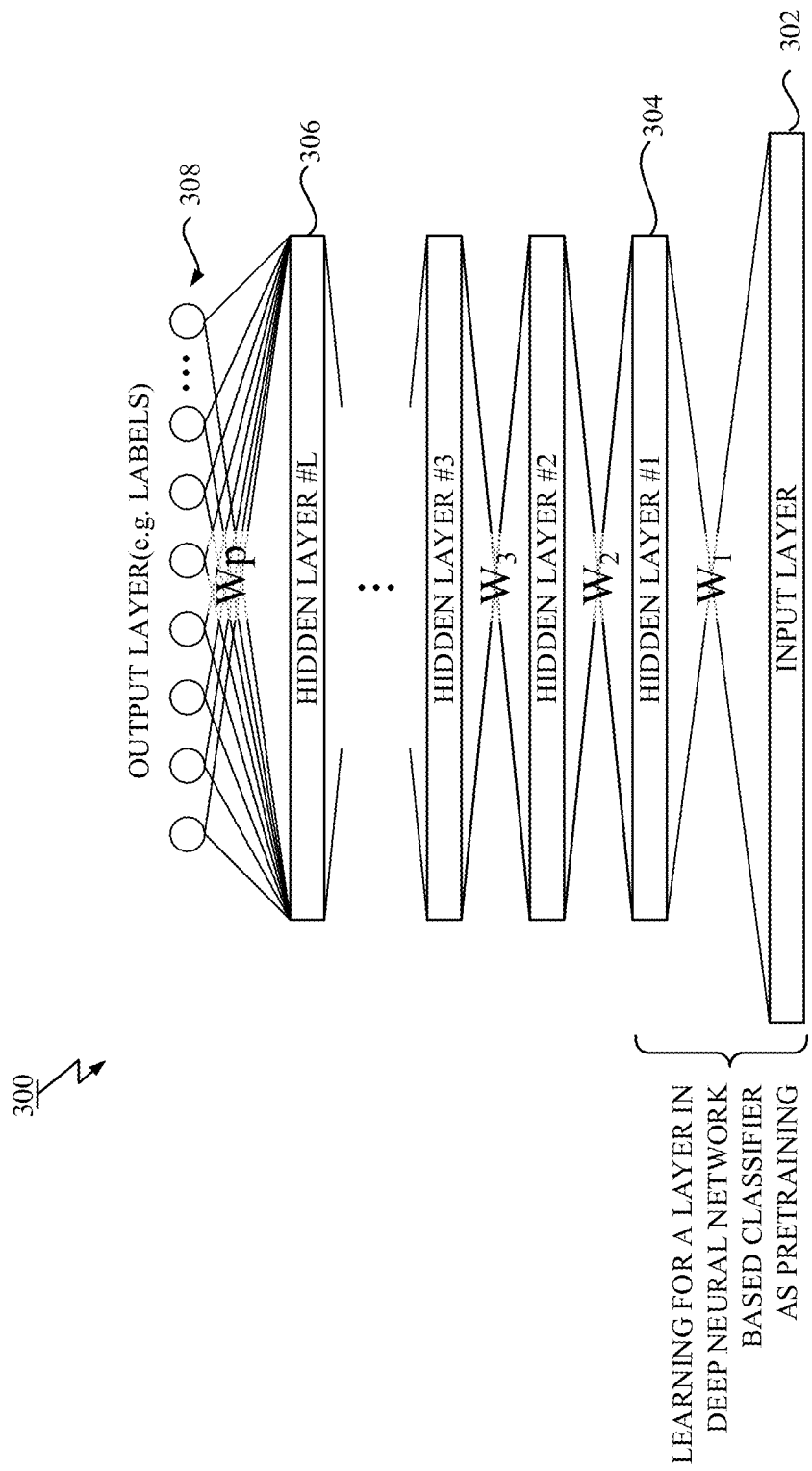
FIG. 7 is a diagram showing an exemplary target of a learning process according to one embodiment.

Referring to FIG. 7, the DNN based classification model 300 has the one or more hidden layers 304-306 between input and output layers 302, 308. The DNN based classification model 300 can perform a classification task. The DNN based classification model 300 receives an input signal and outputs resulted classified labels based on the trained parameters.

During the pre-training process, the parameters of the DNN based classification model 300 are initialized in a layer by layer manner. After the pre-trainings for all layers are completed, the DNN based classification model 300 is constructed by stacking the output layer 308 on the top hidden layer 306 and by adding the connections between units of the top hidden layer 306 and units of the output layer 308 with arbitrary parameters. The whole DNN, including the initialized parameters and newly added parameters, are discriminatively trained by updating the parameters by using backpropagation algorithm during the supervised fine-tuning process.

In one or more embodiments according to the present invention, any one of the hidden layers of the DNN based classification model 300 can be initialized by using the novel learning process as the pre-training. Thus, the computer system and method for learning the deep neural network may include the novel learning process shown in FIG. 3 and FIGS. 4A-B to initialize at least one hidden layer during the pre-training process. The trained DNN based classification model 300 has a part encoding any input signal (including a signal similar to any one of the negative class data) into a representation similar to any one of positive class data.

Even though the parameters are finely tuned after initializing the parameters in the deep learning architectures, resulted performance of the deep neural networks 200, 300 can be affected on how the parameters are initialized closely to the good solution. Accordingly, it is expected that the performance of the deep neural networks 200, 300 can be improved by the novel learning process.

Experimental Studies are Described Below.

A program implementing the process shown in FIG. 3 and FIGS. 4A-B according to the exemplary embodiment was coded and executed for MNIST (Mixed National Institute of Standards and Technology) training set, which is a dataset of handwritten digits, including 60,000 training images (approximately 6,000 images per digit) and 10,000 test images. Images of digits "3" and "5" from the MNIST training set were used as the negative class training images. Images of all other digits from the MNIST training set were used as the positive class training images. The training images were divided into batches with fixed size. The batch size (BATCH_SIZE) was set to 50.

An autoencoder having an input layer of 784 (28*28) units, one hidden layers of 500 hidden units and an output layer of 784 (28*28) units with sigmoid activation on both layers was created as a training target. The RBM was employed as implementation of the autoencoder and the contrastive divergence, CD-1 was used as the unsupervised learning algorithm. The total number of epochs was set to 200 as the termination criterion. To improve training, momentum, weight decay and sparsity were employed.

As for a first example (example-1), the learning process including the positive and negative trainings was conducted to the created autoencoder using all prepared training batches. The number of the negative training iterations (NEG_ITER) was set to be 1 for the first example. As for a second example (example-2), all prepared positive training images and first 500 instances of the negative class training images for each digit were used. Thus, the number of the negative class training images was approximately one thousand, whereas the number of the positive class training images was around fifty thousand. The amount of the negative class training images was approximately 50 times less than the positive class training images. The number of negative training iterations (NEG_ITER) was set to be 5 for the second example.

As for a comparative example, merely positive training was conducted using merely the positive class training images. The topology of the autoencoders used in the comparative example was identical to that of the examples (example-1 and example-2).

In both of the examples and the comparative example, after the learning of the autoencoder was completed, the obtained parameter of the autoencoder was stored on the storage as the trained parameters. The MNIST test images were used for evaluation. The test images were fed into the trained autoencoder and obtained reconstructed images were stored on the storage. In both of the examples and the comparative example, similarities between the test image and reconstructed image by the autoencoder using the trained parameter were calculated using means square error.

Figure 8A:
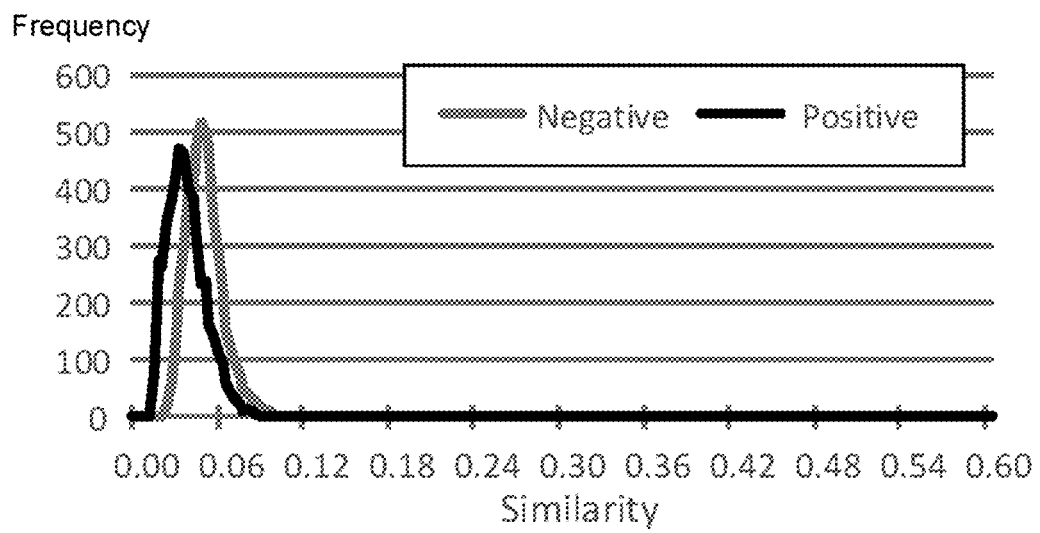
FIG. 8A is a graph showing an exemplary histogram representing frequency distributions of similarity between input and reconstructed images obtained from the autoencoder trained by comparative example.
Figure 8B:
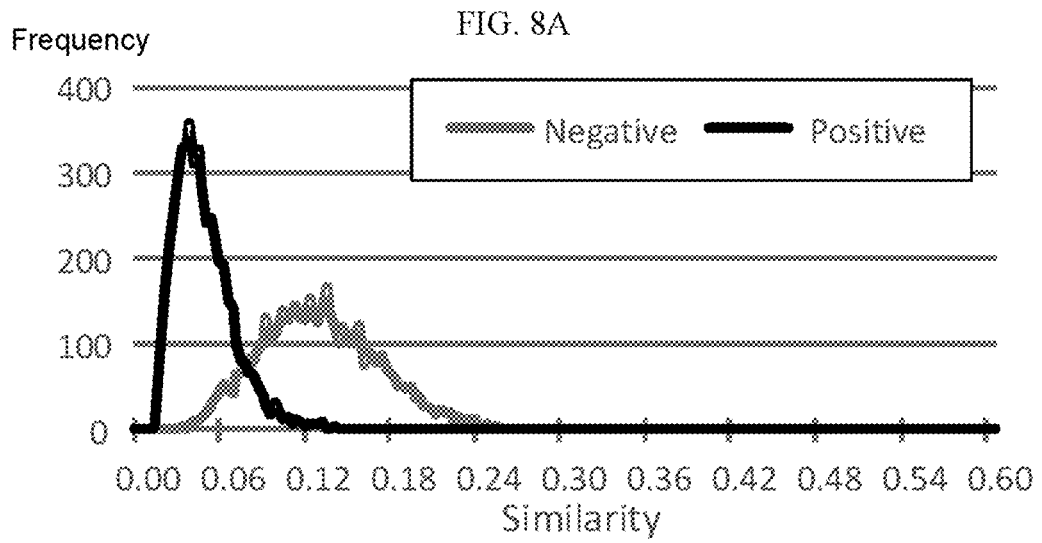
FIG. 8B is a graph showing an exemplary histogram representing frequency distributions of similarity between input and reconstructed images obtained from the autoencoder trained by example-1.
Figure 8C:
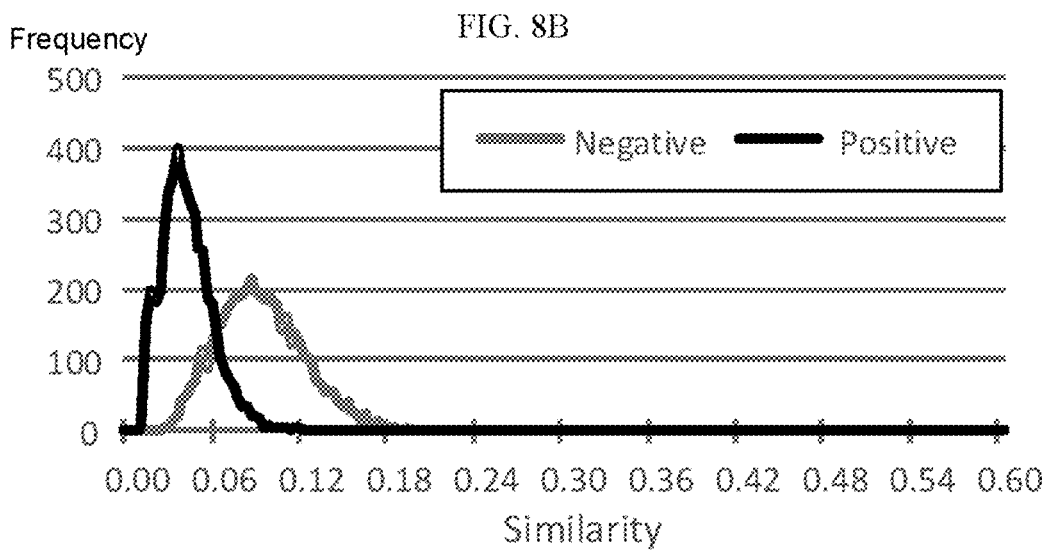
FIG. 8C is a graph showing an exemplary histogram representing frequency distributions of similarity between input and reconstructed images obtained from the autoencoder trained by example-2.

FIG. 8A shows a histogram that represents frequency distributions of similarity between the input and reconstructed images obtained from the autoencoder trained by the comparative example. On the other hand, FIGS. 8B and 8C show histograms, each of which represents frequency distributions of similarity obtained by the example-1 and example-2, respectively.

By comparison with the result of the comparative example, both examples (example-1 and example-2) showed significant improvements.

In the comparative example, the distributions for the positive and negative class images were overlapped. This indicates that the negative class images were still reconstructed well. Thus, discrimination between the positive and negative class images by the similarity may be difficult.

On the other hand, in example-1, the distribution for the negative class images was shifted from the distribution for the positive class images towards lower similarity side. This indicates that the reconstruction of the negative class images was suppressed. Even though the amount of the negative class training images was much smaller than that of example-1, example-2 still showed a preferable separation of the frequency distribution between positive and negative class images.

Figure 9A:
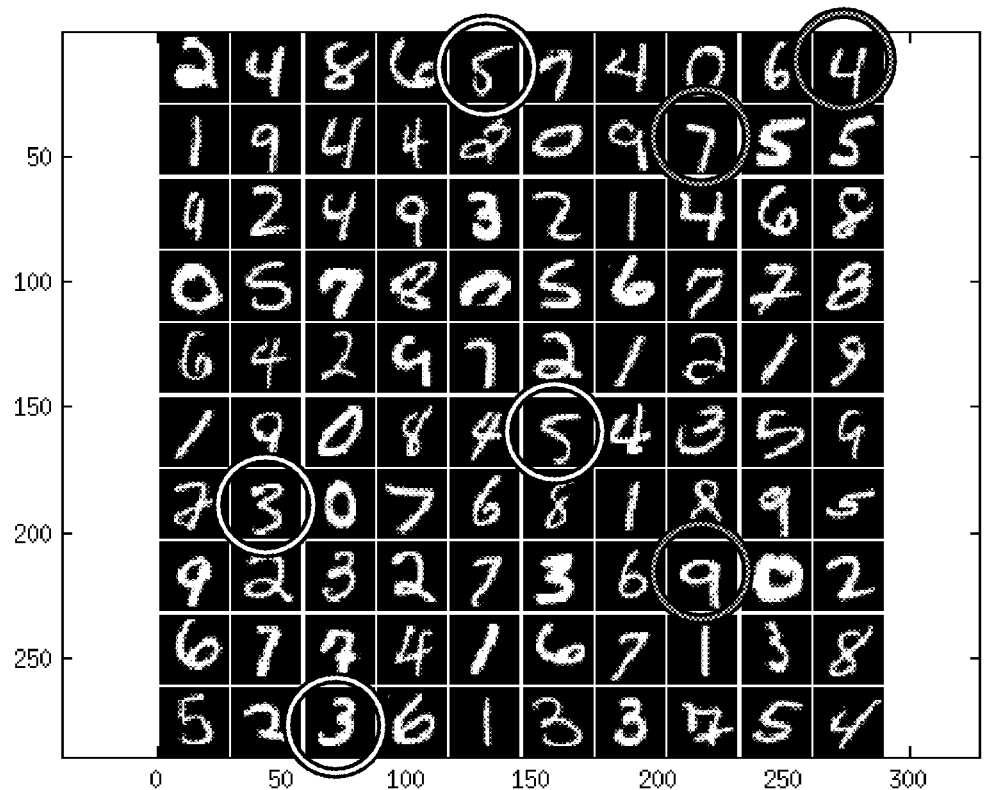
FIG. 9A is a diagram showing a set of test images used for evaluating the examples and the comparative example.
Figure 9B:
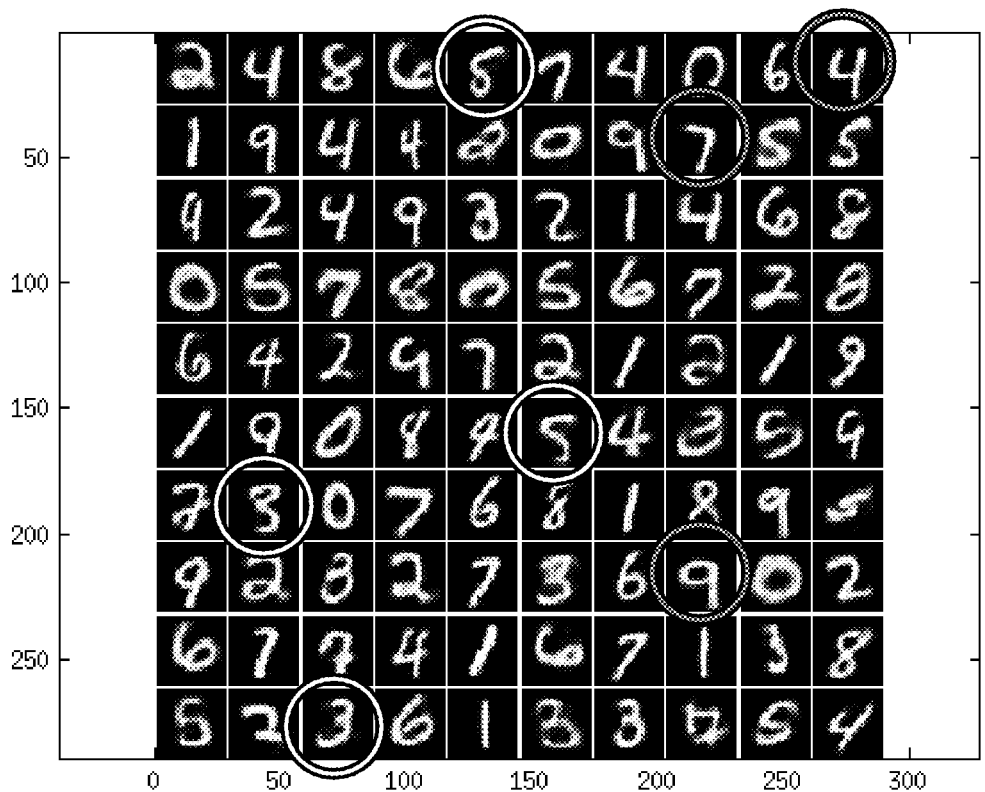
FIG. 9B is a diagram showing a resulted set of reconstructed images by comparative example.
Figure 10A:
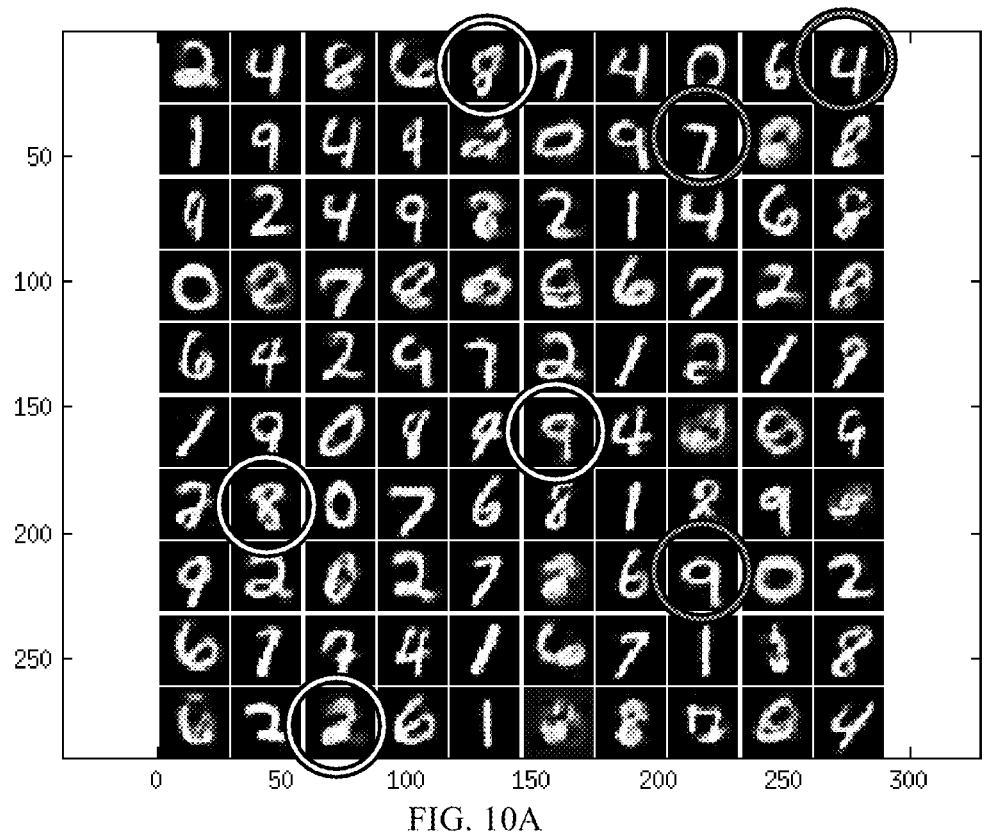
FIG. 10A is a diagram showing a resulted set of reconstructed images by example-1.
Figure 10B:
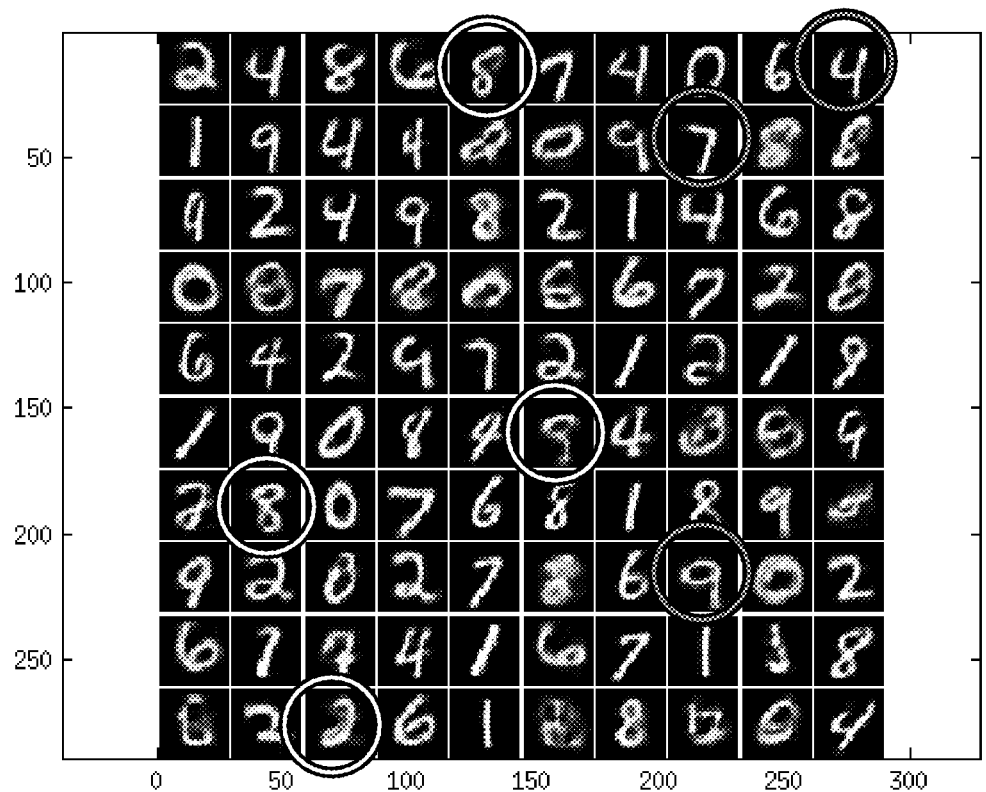
FIG. 10B is a diagram showing a resulted set of reconstructed images by example-2.

Referring to FIGS. 9-10, there are shown a set of test images used for evaluating the examples and the comparative example (FIG. 9A); a resulted set of reconstructed images obtained by the comparative example (FIG. 9B); a resulted set of reconstructed images obtained by example-1 (FIG. 10A); and a resulted set of reconstructed images obtained by example-2 (FIG. 10B).

In FIG. 9A, a test image surrounded by the gray circle represents the image corresponding to the positive class image that should be reconstructed properly, whereas a test image surrounded by the white circle represents the image corresponding to the negative class image that should not be reconstructed properly. Certain positive and negative images are marked through FIGS. 9A-10B in same manner.

By comparing the test images and the reconstructed images by the comparative example (FIG. 9A and FIG. 9B), even though the autoencoder was trained using only the positive class training images in the comparative examples, the autoencoder reconstructed the negative test image well. In contrast to the comparative example, the autoencoders trained by the examples (example-1 and example-2) did not reconstruct the negative test image well. It seems that each negative class test image was reconstructed as some shape close to any one of the positive class images. By comparing the reconstructed images by the comparative example and example-2 (FIG. 9B and FIG. 10B), it has been demonstrated that, even though the size of the negative class training images was much smaller than the size of the positive class images, example-2 showed a significant improvement over the comparative example.

A Computer Hardware Component is described below.

Figure 11:
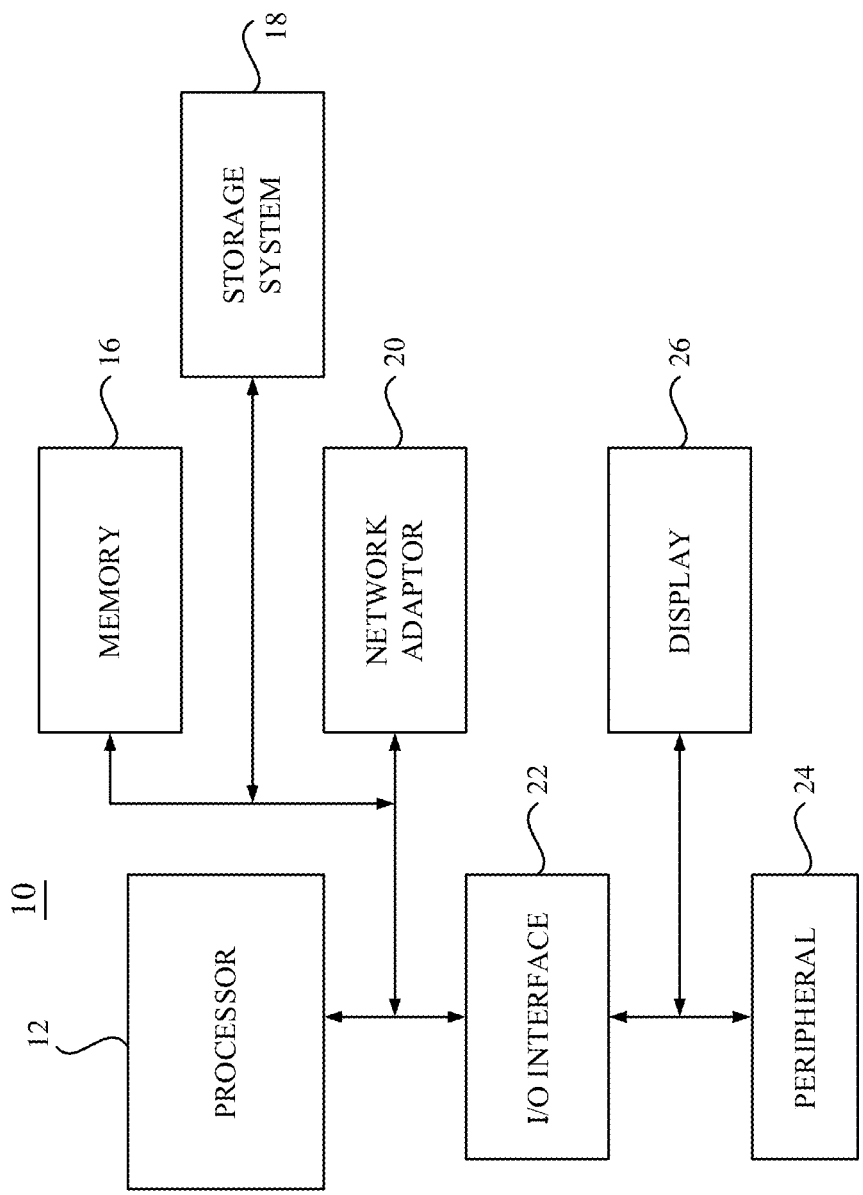
FIG. 11 is a block/flow diagram a computer system according to one embodiment.

Referring now to FIG. 11, a schematic of a computer system 10 is shown. The computer system 10 is only one example of a suitable computer system and is not intended to suggest any limitation as to the scope of use or functionality of embodiments of the invention described herein. Regardless, the computer system 10 is capable of being implemented and/or performing any of the functionality set forth hereinabove.

The computer system 10 is operational with numerous other general purpose or special purpose computing system environments or configurations. Examples of well-known computing systems, environments, and/or configurations that may be suitable for use with the computer system 10 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 10 may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 11, the computer system 10 is shown in the form of a general-purpose computing device. The components of the computer system 10 may include, but are not limited to, a processor (or processing unit) 12 and a memory 16 coupled to the processor 12 by a bus including a memory bus or memory controller, and a processor or local bus using any of a variety of bus architectures.

The computer system 10 typically includes a variety of computer system readable media. Such media may be any available media that is accessible by the computer system 10, and it includes both volatile and non-volatile media, removable and non-removable media.

The memory 16 can include computer system readable media in the form of volatile memory, such as random access memory (RAM). The computer system 10 may further include other removable/non-removable, volatile/non-volatile computer system storage media. By way of example only, a storage system 18 can be provided for reading from and writing to a non-removable, non-volatile magnetic media. As will be further depicted and described below, the storage system 18 may include at least one program product having a set (e.g., at least one) of program modules that are configured to carry out the functions of embodiments of the invention.

Program/utility, having a set (at least one) of program modules, may be stored in the storage system 18 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

The computer system 10 may also communicate with one or more peripherals 24 such as a keyboard, a pointing device, etc.; a display 26; one or more devices that enable a user to interact with the computer system 10; and/or any devices (e.g., network card, modem, etc.) that enable the computer system 10 to communicate with one or more other computing devices. Such communication can occur via Input/Output (I/O) interfaces 22. Still yet, the computer system 10 can communicate with one or more networks such as a local area network (LAN), a general wide area network (WAN), and/or a public network (e.g., the Internet) via a network adapter 20. As depicted, the network adapter 20 communicates with the other components of the computer system 10 via bus. It should be understood that although not shown, other hardware and/or software components could be used in conjunction with the computer system 10. Examples, include, but are not limited to: microcode, device drivers, redundant processing units, external disk drive arrays, RAID systems, tape drives, and data archival storage systems, etc.

Computer Program Implementation is described below.

The present invention may be a computer system, a method, and/or a computer program product. The computer program product may include a computer readable storage medium (or media) having computer readable program instructions thereon for causing a processor to carry out aspects.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects.

Aspects are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for training an image recognition engine, the method comprising:
preparing from input visual images one or more positive class images and one or more negative class images by segmenting input visual images having at least one pixel into image patches, where the image patches are the positive class images and the negative class images;
training an autoencoder based on the positive class images to adjust one or more parameters of the autoencoder so that the positive class images are reconstructed by the autoencoder;
training the autoencoder based on the negative class images to adjust the one or more parameters so that the negative class images are prevented from being reconstructed by the autoencoder; and
reconstructing input visual images based on the one or more parameters, such that reconstructed input visual images include desirable features, and input visual images that are prevented from being reconstructed include undesirable features.

2. The method of claim 1, wherein the training based on the negative class images comprises:
calculating changes in the one or more parameters with gradient of an objective function using an unsupervised learning algorithm; and
updating the one or more parameters based on the changes in an opposite manner to the training based on the positive class images.

3. The method of claim 2, wherein the unsupervised learning algorithm is any one of unsupervised learning algorithms including a contrastive divergence method, a stochastic gradient descent method, a batch gradient descent method, a persistent contrastive divergence method, a Gibbs sampling method or variants thereof.

4. The method of claim 1, wherein iteration for the training based on the negative class images is repeated before the training based on the positive class images is performed.

5. The method of claim 1, wherein the training based on the positive class images and the training based on the negative class images are alternately performed until a predetermined criterion is satisfied and the learning for reconstruction is finished at the training based on the positive class images.

6. The method of claim 1, wherein the autoencoder includes at least parameter used for reconstructing or encoding a signal.

7. The method of claim 1, wherein the autoencoder is an autoencoder or includes at least part of an autoencoder.

8. The method of claim 1, wherein the trained autoencoder encodes an input signal similar to any one of the negative class images and decodes it to the closest representation that is similar to the positive class images.

9. A method for training an image recognition engine, the method comprising:
preparing from input visual images one or more positive class images and one or more negative class images by segmenting input visual images having at least one pixel into image patches, where the image patches are the positive class images and the negative class images;
training the autoencoder based on the positive class images to adjust one or more parameters of the autoencoder;
training the autoencoder based on the negative class images to adjust the one or more parameters in an opposite manner to the training based on the positive class images in regard to gradient of an objective function; and
reconstructing input visual images based on the one or more parameters, such that reconstructed input visual images include desirable features, and input visual images that are prevented from being reconstructed include undesirable features.

10. The method of claim 9, wherein the training based on the negative class images comprises: updating the one or more parameters against the gradient of the objective function.

11. A method for training an image recognition engine implemented by a neural network, the method comprising:
preparing from input visual images one or more positive class images and one or more negative class images by segmenting input visual images having at least one pixel into image patches, where the image patches are the positive class images and the negative class images;
training the neural network based on the positive class images such that connections used to reconstruct the positive class images are strengthened;
training the neural network based on the negative class images such that connections used to reconstruct the negative class images are weakened; and
reconstructing input visual images based on the one or more parameters, such that reconstructed input visual images include desirable features, and input visual images that are prevented from being reconstructed include undesirable features.

12. A computer system for training an image recognition engine by executing program instructions, the computer system comprising:
a memory tangibly stores the program instructions; and
a processor in communications with the memory, wherein the computer system is configured to:
preparing from input visual images one or more positive class images and one or more negative class images by segmenting input visual images having at least one pixel into image patches, where the image patches are the positive class images and the negative class images;
train an autoencoder based on the positive class images to adjust one or more parameters of the autoencoder so that the positive class images are reconstructed by the autoencoder;
train the autoencoder based on the negative class images to adjust the one or more parameters so that the negative class images are prevented from being reconstructed by the autoencoder; and
reconstructing input visual images based on the one or more parameters, such that reconstructed input images include desirable features, and input visual images that are prevented from being reconstructed include undesirable features.

13. The computer system of claim 12, wherein the computer system is further configured to:
calculate changes in the one or more parameters with gradient of an objective function by using an unsupervised learning algorithm to train based on the negative class images; and
update the one or more parameters based on the changes in an opposite manner for the positive class images to train based on the negative class images.

14. The computer system of claim 13, wherein the unsupervised learning algorithm is any one of unsupervised learning algorithms including a contrastive divergence method, a stochastic gradient descent method, a batch gradient descent method, a persistent contrastive divergence method, a Gibbs sampling method or variants thereof.

15. The computer system of claim 12, wherein the computer system is further configured to: repeating iteration for the negative class images before the training based on the positive class images is performed.

16. The computer system of claim 12, wherein the computer system is further configured to:
 train the autoencoder based on the positive class images and the negative class images alternately; and
 train the autoencoder trained based on the positive class images at end of the learning for reconstruction.

17. The computer system of claim 12, wherein the autoencoder is a model including at least parameters used for reconstruction or encoding a signal.

18. The computer system of claim 12, wherein the trained autoencoder encodes an input signal similar to any one of the negative class images and decodes it to the closest representation that is similar to the positive class images.

19. The computer system of claim 12, wherein the computer system is provided in a cloud computing environment.

20. A computer program product for training an image recognition engine, the computer program product comprising a non-transitory computer readable storage medium having program instructions embodied therewith, the program instructions executable by a computer to cause the computer to perform a method comprising:
 preparing from input visual images one or more positive class images and one or more negative class images by segmenting input visual images having at least one pixel into image patches, where the image patches are the positive class images and the negative class images;
 training the autoencoder based on the positive class images to adjust one or more parameters of the autoencoder so that the positive class images are reconstructed by the autoencoder;
 training the autoencoder based on the negative class images to adjust the one or more parameters so that the negative class images are prevented from being reconstructed by the autoencoder; and
 reconstructing input visual images based on the one or more parameters, such that reconstructed input images include desirable features, and input visual images that are prevented from being reconstructed include undesirable features.

21. The computer program product of claim 20, wherein the training based on the negative class images comprises:
 calculating changes in the one or more parameters with gradient of an objective function using an unsupervised learning algorithm; and
 updating the one or more parameters based on the changes in an opposite manner to the training based on the positive class images.

22. The computer program product of claim 21, wherein the unsupervised learning algorithm is any one of unsupervised learning algorithms including a contrastive divergence method, a stochastic gradient descent method, a batch gradient descent method, a persistent contrastive divergence method, a Gibbs sampling method or variants thereof.

23. The computer program product of claim 20, wherein iteration for the training based on the negative class images is repeated before the training based on the positive class images is performed.

24. The computer program product of claim 20, wherein the training based on the positive class images and the training based on the negative class images are alternately performed until satisfying a predetermined criterion, and the learning for reconstruction is finished at the training based on the positive class images.

25. The computer program product of claim 20, wherein the autoencoder is a model including at least parameters used for reconstructing or encoding a signal.

* * * * *